(12) United States Patent
Short et al.

(10) Patent No.: US 7,088,727 B1
(45) Date of Patent: Aug. 8, 2006

(54) SYSTEM AND METHOD FOR ESTABLISHING NETWORK CONNECTION WITH UNKNOWN NETWORK AND/OR USER DEVICE

(75) Inventors: Joel E. Short, Los Angeles, CA (US); Leonard Kleinrock, Los Angeles, CA (US)

(73) Assignee: Nomadix, Inc., Westlake Village, CA (US)

( * ) Notice: Subject to any disclaimer, the term of this patent is extended or adjusted under 35 U.S.C. 154(b) by 927 days.

(21) Appl. No.: 09/684,937

(22) Filed: Oct. 6, 2000

Related U.S. Application Data

(63) Continuation of application No. 09/041,534, filed on Mar. 12, 1998, now Pat. No. 6,130,892, which is a continuation-in-part of application No. 08/816,174, filed on Mar. 12, 1997, now abandoned.

(51) Int. Cl.
*H04J 3/16* (2006.01)
*H04L 12/56* (2006.01)

(52) U.S. Cl. .................. 370/401; 370/338; 370/466
(58) Field of Classification Search .............. 370/401, 370/338, 389, 466, 392, 229, 252, 390, 393, 370/395, 397, 400, 402, 404, 406, 409, 465, 370/467, 254, 255, 408; 709/238, 220, 228, 709/221, 242, 230, 245, 225, 222, 223, 219, 709/226, 229
See application file for complete search history.

(56) References Cited

U.S. PATENT DOCUMENTS

| | | | |
|---|---|---|---|
| 5,159,592 A | 10/1992 | Perkins | |
| 5,309,437 A | 5/1994 | Perlman | |
| 5,325,362 A | 6/1994 | Aziz | |
| 5,371,852 A | 12/1994 | Attanasio et al. | |
| 5,412,654 A | 5/1995 | Perkins | |

(Continued)

FOREIGN PATENT DOCUMENTS

| | | |
|---|---|---|
| JP | 5-344122 | 12/1993 |
| JP | 5344122 A2 | 12/1993 |
| JP | 7066809 | 3/1995 |
| JP | 8065306 A2 | 3/1996 |
| WO | WO 97/11429 | 3/1997 |

OTHER PUBLICATIONS

Network Working Group, The IP Network Address Translator (NAT) (May 1994) www.ftp.isi.edu/in-notes/rfc1631.txt.

Official Communication mailed Nov. 22, 2005 for EP Patent Appl. No. EP 98 909 121.0.

U.S. Appl. No. 6,130,892, filed Feb. 15, 2005 Request for Reexamination.

(Continued)

*Primary Examiner*—Ajit Patel
(74) *Attorney, Agent, or Firm*—Brooks Kushman P.C.

(57) ABSTRACT

A system and method for connecting a user device to a network where the user device settings, the network settings, or both are unknown include intercepting packets transmitted by the user device and modifying the packets to be compatible with the network. The system and method are particularly suited for use by mobile computers, such as laptop computers, which are connected to various foreign networks. Depending upon the particular application, a device may be carried with the mobile computer, or attached as a node on the network. The device automatically determines the network settings of the user device and/or the network and modifies packets appropriately so that the user device can communicate over the network without having to reconfigure the user device with appropriate settings for each network it may encounter. Communication settings such as network address, gateway, proxy address, etc. are automatically determined using various techniques.

20 Claims, 10 Drawing Sheets

U.S. PATENT DOCUMENTS

| | | | |
|---|---|---|---|
| 5,425,029 | A | 6/1995 | Hluchyj et al. |
| 5,442,633 | A | 8/1995 | Perkins et al. |
| 5,490,139 | A | 2/1996 | Baker et al. |
| 5,517,618 | A | 5/1996 | Wada et al. |
| 5,539,736 | A | 7/1996 | Johnson |
| 5,557,748 | A | 9/1996 | Norris |
| 5,572,528 | A | 11/1996 | Shuen |
| 5,586,269 | A | 12/1996 | Kubo |
| 5,608,786 | A | 3/1997 | Gordon |
| 5,636,216 | A | 6/1997 | Fox et al. |
| 5,651,002 | A | 7/1997 | Van Seters et al. |
| 5,708,655 | A | 1/1998 | Toth et al. |
| 5,708,780 | A | 1/1998 | Levergood et al. |
| 5,751,971 | A | 5/1998 | Dobbins et al. |
| 5,781,550 | A | 7/1998 | Templin et al. |
| 5,781,552 | A | 7/1998 | Hashimoto |
| 5,790,541 | A | 8/1998 | Patrick et al. |
| 5,793,763 | A | 8/1998 | Mayes |
| 5,798,706 | A | 8/1998 | Kraemer et al. |
| 5,802,320 | A | 9/1998 | Baehr et al. |
| 5,812,531 | A | 9/1998 | Cheung et al. |
| 5,812,776 | A | 9/1998 | Gifford |
| 5,841,769 | A | 11/1998 | Okanoue et al. |
| 5,854,901 | A | 12/1998 | Cole et al. |
| 5,862,345 | A | 1/1999 | Okanoue et al. |
| 5,909,549 | A | 6/1999 | Compliment |
| 5,910,954 | A * | 6/1999 | Bronstein et al. ........... 370/401 |
| 5,915,119 | A | 6/1999 | Cone |
| 5,918,016 | A | 6/1999 | Brewer et al. |
| 5,920,699 | A | 7/1999 | Bare |
| 5,960,409 | A | 9/1999 | Wexler |
| 5,963,915 | A | 10/1999 | Kirsch |
| 5,991,828 | A | 11/1999 | Horie et al. |
| 6,006,272 | A | 12/1999 | Aravamudan et al. |
| 6,012,088 | A | 1/2000 | Li |
| 6,014,698 | A | 1/2000 | Griffiths |
| 6,055,243 | A * | 4/2000 | Vincent et al. ............. 370/466 |
| 6,061,356 | A * | 5/2000 | Terry .......................... 370/401 |
| 6,098,172 | A | 8/2000 | Coss et al. |
| 6,119,162 | A | 9/2000 | Li et al. |
| 6,226,677 | B1 | 5/2001 | Slemmer |
| 6,249,527 | B1 * | 6/2001 | Verthein et al. ............ 370/466 |
| 6,377,990 | B1 * | 4/2002 | Slemmer et al. ............ 709/225 |
| 6,410,543 | B1 | 6/2002 | Strobel et al. |
| 6,463,051 | B1 * | 10/2002 | Ford ............................ 370/352 |
| 6,640,251 | B1 * | 10/2003 | Wiget et al. ................. 709/238 |
| 2002/0097674 | A1 * | 7/2002 | Balabhadraptreuni et al. |

OTHER PUBLICATIONS

Copy of patent application for Ser. No. 08/816,174, filed Mar. 12, 1997.

Single–User Network Access Security TACACS+ http://www.cisco.com/warp/public/614/7.html IP3 002876–002884.

Networking Working Group Request For Comments: 826 –Ethernet Address Resolution Protocol (Nov. 1982).

Network Working Group Request For Comments: 894 –Standards For Transmission of IP Datagrams Over Ethernet Networks (Apr. 1984).

Network Working Group Request For Comments: 925 –Multi–LAN Address Resolution (Oct. 1984).

Network Working Group Request For Comments: 1009 –Requirements For Internet Gateways (Jun. 1987).

Network Working Group Request For Comments: 1027 –Using ARP to Implement Transparent Subnet Gateways (Oct. 1987).

Networking Working Group Request For Comments: 1034 –Domain Names –Concepts and Facilities (Nov. 1987).

Network Working Group Request For Comments: 1531 –Dynamic Host Confirmation Protocol (Oct. 1993).

Network Working Group Request For Comments: 1919 –Classical Versus Transparent IP Proxies (Mar. 1996).

Network Working Group Request For Comments: 1945 –Hypertext Transfer Protocol –HTTP/1.0 (May 1996).

L. Kleinrock, "Nomadic Computing" (Keynote address) *Int'l Conf. on Mobile Computing and Networking,* 1995, Barkeley, California, ACM.

M. Baker et al., Supporting Mobility in MosquitoNet, Proceedings of the 1996 USENIX Technical Conference, San Diego, CA, Jan. 1996.

Comer, "Internetworking With TCP/IP vol. 1, Chapter 10, Principles, Protocols, and Architecture", $3^{rd}$ ed., Prentice Hall 1995.

Joel E. Short: "Auto–Porting and Rapid Prototyping with Application to Wireless and Nomadic Network Algorithms, A dissertation submitted in partial satisfaction of the requirements for the degree of Doctor of Philosophy in Computer Science", University of California, Los Angeles; Published Oct. 26, 1996; pp. xv, 118–124; Copyright Jan. 16, 1997.

Case No. 04CV11485 BTM (POR): IP3 Networks, Inc. v Nomadix, Inc. –Jul. 23, 2004 Complaint for: (1) Declaratory Judgement of Patent Non–Infringement and Invalidity of U.S. Appl. No. 6,636,894; (2) Declaratory Judgement of Patent Non–Infridgement of U.S. Appl. No. 6,130,893; (3) Trade Libel; (4) Libel Under Cal. Civ. Code § 45; (5) Unfair Competition Under Cal. Bus.& Prof. Code § 17200, Et Seq.; and (6) Intentional Interference with Prospective Economic Advantage –Demand for Jury Trial.

Case No. 04CV1485 BTM (POR): IP3 Neworks, Inc. v Nomadix, Inc. –Oct. 21, 2004 Answer and Counterclaims of Nomadix, Inc. to the Amended Complaint.

Case No. 04CV1485 BTM (POR): IP3 Networks, Inc. v Nomadix, Inc. –Plaintiff/Counter–Defendant IP3 Networks Inc.'s Reply to Defendant Nomadix, Inc.'s Counterclaim.

Perkins C. E. et al.: "DHCP for Mobile networking with TCP/IP" Proceedings IEEE International Symposium on Computers and Communications, Jun. 27, 1995, pp. 255–261, XP002132695.

Perkins C.E. ED –Institute of Electrical and Electronics Engineers: "Mobile–AP, AD–HOC Networking, and Nomadicity" Proceedings of the $20^{th}$ . Annual International Computer Software and Applications Conference (COMPSAC) . Seoul, Aug. 21–23, 1996, Proceedings of the Annual International Computer Software and Applications Conference (COMPSAC), Los Alamitos, IEEE Comp. vol. CONF. 20, Aug. 21, 1996, pp. 472–476, XP 000684381. ISBN 0–8186–7579–9.

The Patent Office of the People's Republic of China Notification of First Office Action (PCT Application) and its translation for Chinese patent application 98 8 05023.4.

Google Groups: View Thread, Aug. 2, 2004, IP3 002505–06; Newsgroups: microsoft, public.win95.networking.

Google Groups: View Thread, Aug. 2, 2004, IP3 002507–10; Newsgroups: comp.os.os2.networking.tcp–ip.

Google Groups: network settings DHCP mobile, Aug. 3, 2004 IP3 002511–15; Newsgroups: comp.sys.mac.comm.

Google Groups: netswitcher; Aug. 2, 2004; IP3 002516; Newsgroup: comp.os.ms–windows.networking.win95; .

Product Information –Netswitcher, the ultimate windows network setup utility; Aug. 2, 2004; IP 3 002517; Netswitcher™, Developed and Marketed by: J.W. Hance, 1950–18 E. Greyhound Pass, Suite 305, Carmel, Indiana 46033 USA.

Google Groups: network laptop settings, Jul. 30, 2004; IP3 002767–68; Laptop on Dual Networks; Newsgroups: comp.os.ms–windows.nt.admin.networking.

Google Groups: network configuration laptop packets; Aug. 2, 2004 IP3 002765–66; Newsgroups: comp.protocols.tcp–ip.

Google Groups: "home network" laptop; Aug. 3, 2004; IP3 002769–70; Newsgroups: comp.sys.sun.admin. Newsgroups: comp.sys.sun.admin.

Google Groups: redirect "login page" Jul. 28, 2004; IP 3 002873–74; Newsgroup: microsoft.public,inetserver.iis.activeserverpages.

* cited by examiner

SYSTEM AND METHOD FOR ESTABLISHING NETWORK CONNECTION WITH UNKNOWN NETWORK AND/OR USER DEVICE

CROSS-REFERENCE TO RELATED APPLICATIONS

This application is a continuation of U.S. application Ser. No. 09/041,534, filed on Mar. 12, 1998, now U.S. Pat. No. 6,130,892, which is a continuation-in-part of U.S. application Ser. No. 08/816,174, filed on Mar. 12, 1997, now abandoned.

U.S. government may have rights in this invention as provided for by the terms of Contract No. DAAH01-97-C-R179 awarded by DARPA.

TECHNICAL FIELD

The present invention is generally related to the art of network communications.

BACKGROUND ART

User digital communication addresses such as internet or IP addresses are conventionally associated with a fixed physical location, similar to a user's business telephone line. However, portable communication devices such as laptop computers are becoming increasingly popular, and it is common for a user to access the internet from locations as diverse as hotel rooms and airplanes.

Digital communication networks are set up to route communications addressed to a communication or network address to an associated destination computer at an established physical location. Thus, if a laptop computer is moved to a remote location, communications to and from the laptop computer may not reach the new physical location.

For a computer (host) to communicate across a network (e.g., the internet), software protocols (e.g., Transport Control Protocol/Internet Protocol (TCP/IP)) must be loaded into the host. A host computer sends information (i.e., packets of data) to another destination computer via devices on the network (routers) which receive the packets and send the packets to the network or segment of the destination host. The destination host will route replies back using a similar process. Each host computer and router must therefore be configured to send the packets of data to an appropriate router to reach the intended destination. However, a router will receive the packets only if the host computers specifically send (address) the packets to that router at the link layer of the communication protocol. If a host is configured incorrectly (bad address or address of a router not on the local network), then the host computer and router will be unable to communicate, i.e., the router will not listen to the host or will "drop" packets.

With the advent of mobile computers (laptops) and the desire to plug them into various networks to gain access to the resources on the network and internet, a mobile computer must be reconfigured for each network. Traditionally this new configuration can be done either (i) manually in software on the mobile computer (usually causing the mobile computer to be restarted to load the new configuration), or (ii) with a new set of protocols which must be utilized on the mobile computer to obtain the configuration information from a device on the network to which the computer is being connected. When new services (protocols) are created to add functionality to the host computers, these new protocols may need to be updated in the host computers or routers, depending upon the type of new functionality being added.

DISCLOSURE OF INVENTION

In accordance with the present invention, a "Nomadic" router or translator enables a laptop computer or other terminal which is configured to be connected to a local home network to be connected to any location on the internet or other digital data communication system. The nomadic router automatically and transparently reconfigures packets sent to/from the terminal for its new location by processing outgoing and incoming data.

The nomadic router includes a processor which appears as the home network to the terminal, and appears as the terminal to the communication system. The terminal has a terminal address, the nomadic router has a router address, and the terminal transmits outgoing data to the system including the terminal address as a source address. Whether or not the message is addressed to the nomadic router at the link layer, the processor intercepts the message and translates the outgoing data by replacing the permanent address with the router address as the source address. Incoming data intended for the terminal from the system includes the translator address as a destination address, and the processor translates the incoming data by replacing the translator address with the permanent address as the destination address.

The terminal can be directly connected to a point on a local network, and the nomadic router connected to another point on the network. The nomadic router can be employed to implement numerous applications including nomadic e-mail, network file synchronization, database synchronization, instant networking, a nomadic internet, mobile virtual private networking, and trade show routing, and can also be utilized as a fixed nomadic router in hotels, or multi-dwelling units, or multiple tenant units, for example.

The nomadic router can be implemented as software and/or hardware. The nomadic router establishes location and device transparency for a digital communication terminal such as a laptop computer. The terminal can be connected to any of a variety of networks and locations which can employ a variety of communication interface devices.

The nomadic router automatically converts the actual location address to a unique communication address for the user such as an internet address, such that the terminal performs communications originating from the communication address regardless of the physical location of the terminal.

The nomadic router includes software and services which can be packaged in a personal portable device to support a rich set of computing and communications capabilities and services to accommodate the mobility of nomads (users) in a transparent, integrated, and convenient form. This is accomplished by providing device transparency and location transparency to the user.

There is a vast array of communication device alternatives such as Ethernet, Wireless LAN, and dialup modem among which the user switches when in the office, moving around the office, or on the road (such as at a hotel, airport, or home). The device transparency in the nomadic router provides seamless switching among those devices (easily, transparently, intelligently, and without session loss). The location transparency support in the nomadic router prevents users from having to reconfigure (e.g., IP and gateway address) their network device (laptop) each time they move to a new network or subnetwork.

The present nomadic router provides a separation of location and identity by providing a permanent IP address to the network device (host). The nomadic router provides independence between the location, communication device, and the host operating system. There are no new standards which need to be adopted by the networking community. All specialized processing is stored internally to the nomadic router with standard interfaces to the host device and various communication devices.

The nomadic router supports the migration to Network Computers by providing identity and security services for the user. The nomadic router also supports multiple parallel communication paths across the communications network for soft handoff, increased throughput, and fault tolerance by supporting multiple communication substrates.

A portable router for enabling a data communication terminal to be location and device transparent according to the present invention, comprises: a first module for storing a digital communication address of a user; a second module for detecting a data communication network location to which the terminal is connected; a third module for detecting communication devices that are connected to the terminal; a fourth module for establishing data communication between the terminal and the network such that the communication address of the location from the second module is automatically converted to the communication address of the user from the first module; and a fifth module for automatically selecting a communication device which was detected by the third module for use by the fourth module.

The present nomadic router utilizes a unique process embodied in a self-contained apparatus which manipulates the packets of data being sent between the host computers and routers. This process provides an intelligent active universal translation of the content of the packets being transmitted between the host computer and nomadic router. The translation allows the host computer to communicate with the nomadic router, which intercepts packets from the host, even when the host computer is not configured to communicate with the nomadic router.

This is achieved by the nomadic router pretending to be the router for which the host is configured, and by the nomadic router pretending to be the host with which the router expects to communicate. Therefore, the nomadic router supports the mobility of computers in that it enables these computers to plug into the network at different locations (location independence) without having to install, configure, or utilize any net protocols on the mobile computer.

The mobile computer continues to operate without being aware of the change in location or configuration of the new network, and the nomadic router translates the data allowing the host to think that it is communicating with its home router. By putting this process in a self-contained apparatus, the deployment of new protocols can be performed independently of the host computer and its operating system (host independent).

All specialized processing and translation is stored internally in the nomadic router with standard interfaces to the host device and various communication devices. Thus, no new standards need be adopted. By removing the complexity of supporting different network environments out of the mobile computer and into this self-contained apparatus, the nomadic router allows the host computer to maintain a very minimal set of software protocols and functionality (e.g., the minimum functionality typically installed in network computers) to communicate across the network.

The nomadic router translation ability also enables the use of alternate communication paths (device independence) without the host computer being aware of any new communication device that utilizes an alternate communication path. The translation of the packets is done not just at the physical, link, or network layer of the protocol stack but at the transport and application layers as well. This allows the network card, protocol stack, and application running on the host computer to be independent of the network environment and configuration.

As an example of the communication device independence, the translation allows soft handoff, increased throughput, and fault tolerance by supporting multiple communication substrates. In addition, the nomadic router translation ability provides a flexible process for deploying enhanced nomadic and mobile computing software and services such as filtering of packets and determining which packets should be allowed to be transmitted between the mobile computer and the nomadic router or local area network (Internal Firewall).

The router apparatus can be: (i) carried with the mobile user (e.g., using an external box); (ii) attached to the mobile computer (e.g., PCMCIA card); (iii) installed inside the mobile computer (e.g., a chip in the laptop); (iv) or installed into the remote network infrastructure to provide network access for any mobile computer (e.g., a box which plugs into the remote or foreign local area network translating packets being sent between the host and its router, or a chip which is installed in routers on the remote network). The nomadic router can also be provided in the form of software which is loaded into and run in the mobile computer or another computer or router on a network.

These and other features and advantages of the present invention will be apparent to those skilled in the art from the following detailed description, taken together with the accompanying drawings, in which like reference numerals refer to like parts.

BEST MODE FOR CARRYING OUT THE INVENTION

Figure 1:
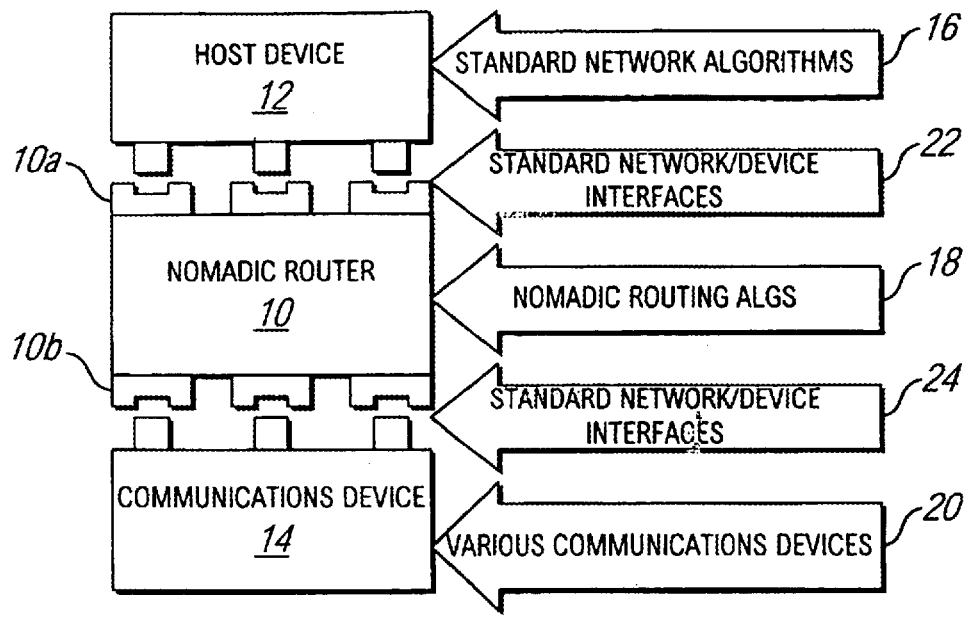
FIG. 1 is a diagram illustrating one implementation of a nomadic router positioned between the host computing device and various communication devices using standard interfaces.

FIG. 1 illustrates a "nomadic" translator or router 10 embodying the present invention as being connected between a host device or computer 12 and a communications device 14. Host device 12 is a laptop computer or other fixed or mobile digital data communication terminal which is sufficiently portable or mobile that it can be carried from one location to another. A laptop computer, for example, can be used in any convenient location such as an airplane, customer's office, home, etc.

Communications device 14 can be part of any type of communication system to which host computer 12 can be connected. Such communication systems include, but are not limited to, local networks, wide area networks, dial-up and direct internet communications, etc. In a typical application, the communications device will connect the host computer to a local network which itself is connected to the internet. Thus, host device 12 is able to communicate with an unlimited number of networks and nodes which are themselves interconnected with routers, switches, bridges, etc. in any known manner.

Router 10 includes a terminal interface 10a which normally is used to connect router 10 to host device 12, and a system interface 10b which connects router 10 to communications device 14. Router 10 generally includes a processor consisting of hardware and/or software which implements the required functionality. Router 10 is further configured to operate in an alternate mode in which host device 12 is connected directly to a network, and router 10 is also connected to a point in the network via system interface 10b. In this case, terminal interface 10a is unused.

Although device 10 is described herein as being a router, it will be understood that router 10 is not a conventional router in that it includes the capability for providing interconnectability between networks. Instead, router 10 is essentially a translator which enables host device 12 to be automatically and transparently connected to any communications device 14, and process incoming and outgoing data for device 12.

Host device 12 may be provided with a permanent internet address which conveniently need not be changed in accordance with the present invention. Device 12 is initially configured to communicate with a particular gateway or other home device at its base location. The gateway has a link layer address which device 12 attempts to locate when it is connected to any communication system. Without the functionality of the present nomadic router 10, host device 12 would not be able to operate at a remote location because it would not find its gateway.

It will be understood that the term "home" does not relate to a residence, but is the network, gateway or other communication device or system to which the terminal is normally connected and which corresponds to the home internet or IP address.

FIG. 1 further illustrates a top protocol layer 16 representing host computer device 12 which generates and consumes data that is transferred through communications device 14. Interface 16 is below the IP layer, and above the link layer in the typical OSI/ISO model. In the middle is a layer 18, which represents router 10, whose function is to adaptively configure and utilize the underlying communications device and provide router support. A lower layer 20 is a physical communication which carries out the communication (potentially wire-lined internet based, ad-hoc or wireless) as made available and determined for use by the nomadic router or user. Between router layer 18 and layers 16 and 20 are interfaces 22 and 24 which router 10 identifies and configures dynamically.

Figures 7A, 7B, 7C:
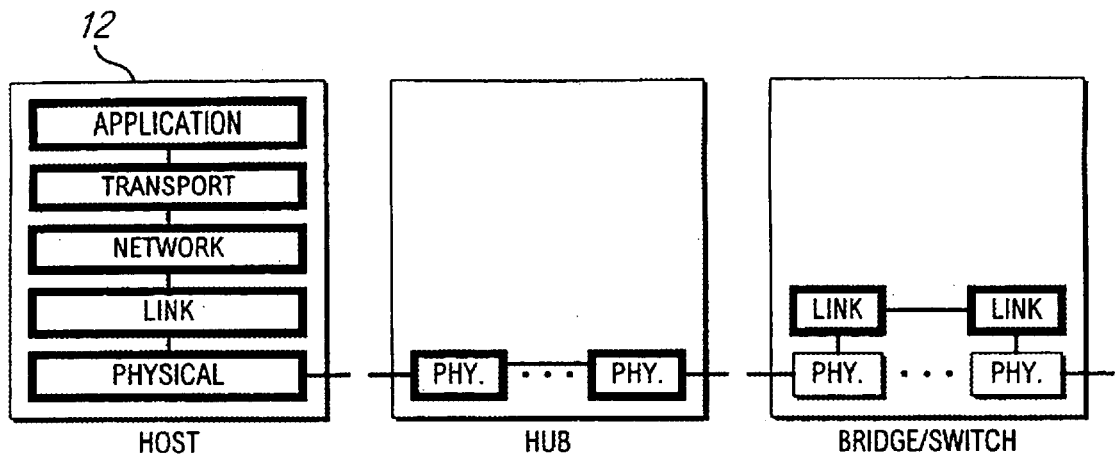
FIGS. 7A to 7G are diagrams illustrating protocol stack implementations for various network devices, with the translation function performed for all layers of the protocol stack in the nomadic router.

The present invention operates with host computers, routers, and other network devices through well-defined standard interfaces such as specified by the IETF (Internet Engineering Task Force) and IEEE standardization committees. These standards specify the packet format, content, and physical communication characteristics. As shown in FIG. 7A, host computers have to be configured at various layers of the protocol stack depending on the communication capabilities and configurations of the current network.

Hubs, as shown in FIG. 7B, provide a well defined interface to connect host computers and network devices by transmitting packets across multiple physical connections. Hubs do not provide any manipulation or translation of the content of the packets being transmitted.

Bridges or switches, as shown in FIG. 7C, provide an intelligent filtering mechanism by which packets are transmitted across multiple physical connections based upon the physical connection the device is connected to, according to the link layer addressing (Media Access Control Address). Bridges and switches do not manipulate the content of the packet and do not provide any higher layer protocol functionality.

Figures 7D, 7E, 7F:
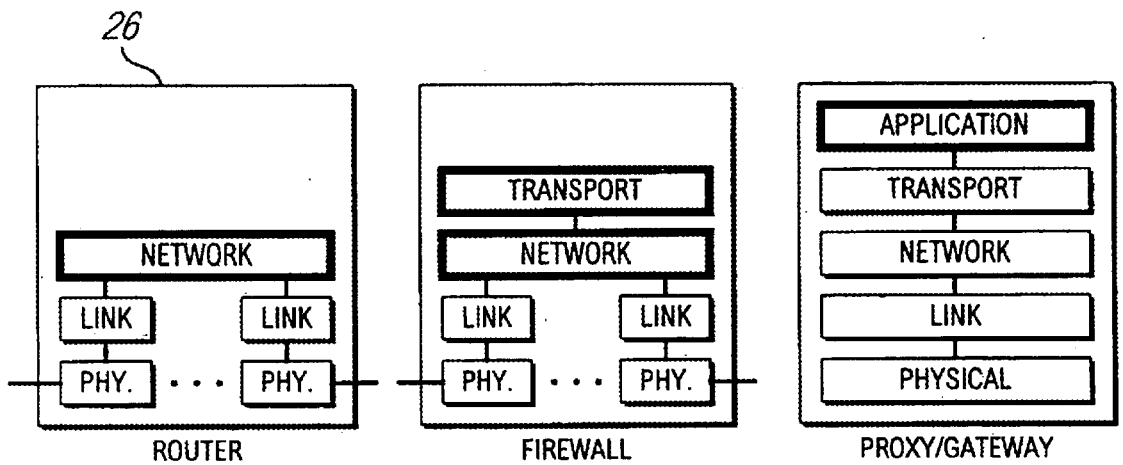

Routers, as shown in FIG. 7D, accept packets based upon the destination address at the network layer in the packet. However, the host computer must explicitly address the packet to the router at the link layer. The router will then retransmit the packet across the correct physical connection based upon how it is configured. No modification or translation of the packet is performed at any higher layer of the protocol stack than the network layer.

Firewalls, as shown in FIG. 7E, filter packets at the network and transport layers to allow only certain packets to be retransmitted on the other physical connection. Firewalls do not manipulate the content of the packet, only forward it on to the next hop in the network if it passes the transport (port) or network (IP address) filter.

Figure 7G:
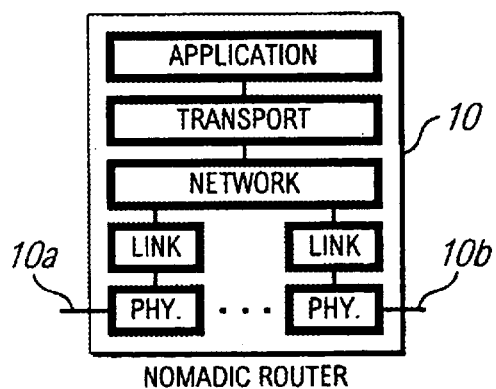

Proxies and gateways, as shown in FIG. 7F, only receive packets explicitly addressed to them by host computers. They only manipulate packets at the application level. The present nomadic router 10, as shown in FIG. 7g, manipulates the content of the packets at the link, network, transport, and application layers of the protocol stack to provide a translation between the host computer configuration and the configuration of the remote or foreign network to which the host computer is currently attached.

Unlike all other devices shown in FIGS. 7A to 7F, router 10 will automatically intercept and translate packets without the other devices being aware of router 10 or being configured to use it, i.e., without packets being addressed to router 10. The translation algorithms in router 10 which provide this location independence are provided completely internal to router 10. Thus, no new standards need to be developed, accepted, or implemented in host computers 12 or routers 26 to deploy new network services when using the nomadic router.

Whenever a new or different communication device (which includes the link and physical layers) is utilized in a host computer 12, the host computer's network layer must be aware of this new communication device. Since router 10 has its own network interface to the communication device, alternate communication devices can be utilized in router 10 which the host computer 12 can utilize but does not have to be configured to use.

Today we communicate with individuals in terms of the location of their communications instruments (for instance, their computer's IP address or their fax machine's phone number). To support mobility and changing communication environments and devices, it is necessary to create an environment where people communicate with other people, and not specifically with the devices they use. To transparently support mobility and adaptivity in a wireless, potentially ad-hoc, communication internetwork, a common virtual network must be provided by an intelligent device or agent which supports the various computing hosts and communication devices.

The present nomadic router 10 provides the mapping between the location based IP address used in the internet today and the permanent user based address housed in the host CPU in the device 12. This is illustrated in FIG. 2 as "IP Mapping." This mapping is done without support or knowledge of such mapping by the host CPU or user.

Figure 3:
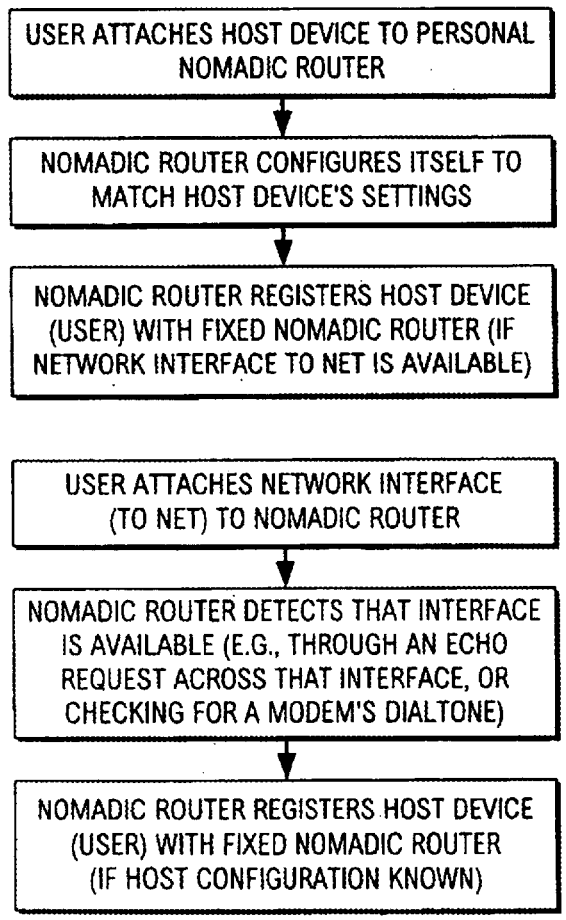
FIG. 3 is a flowchart illustrating a configuration overview of the basic steps performed when a host device is attached to the present nomadic router and when a network interface is attached to the router.
Figure 4:
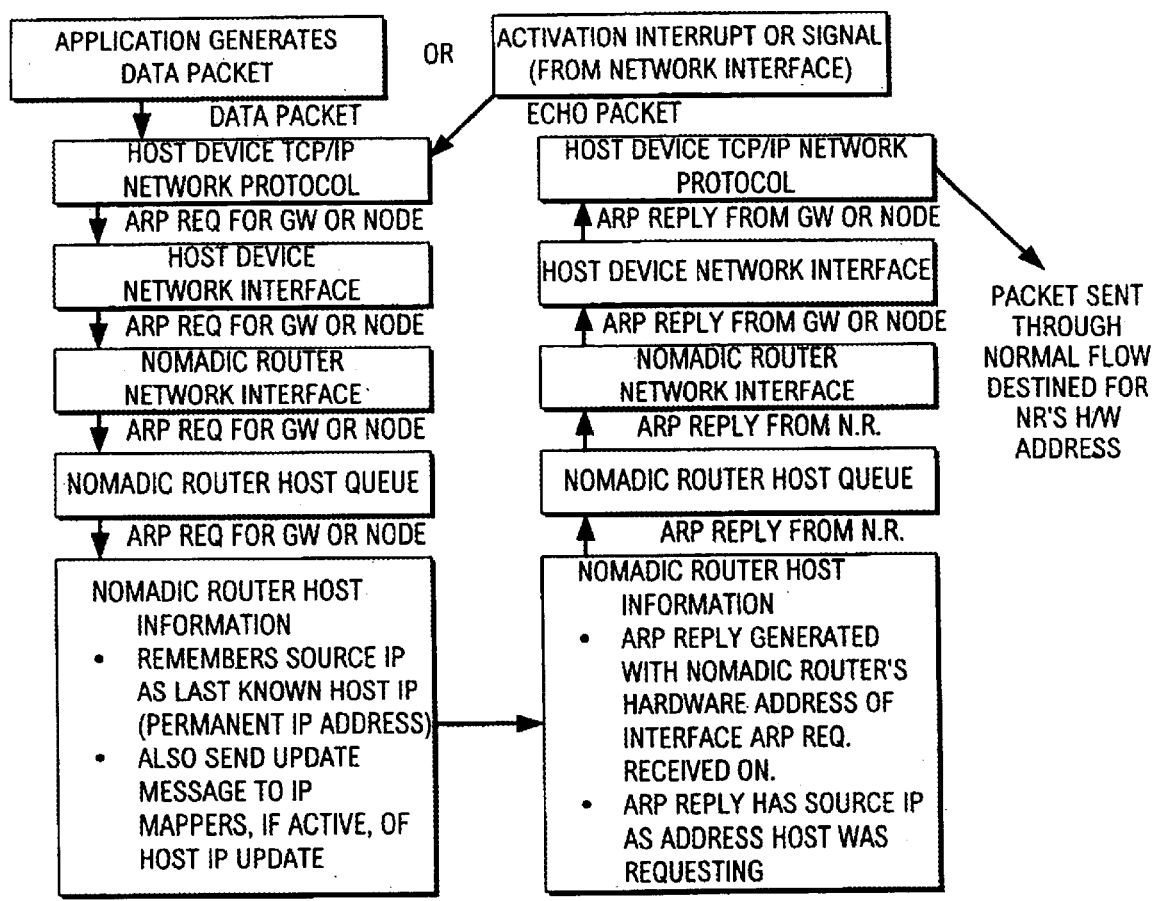
FIG. 4 is a flowchart illustrating automatic adaptation to the host device when the first data packet from the host is sent to a home network router or when an activation interrupt or signal is received.

The internet RFC 2002 Mobile IP protocol specifies the mapping between permanent and temporary IP addresses. The unique aspect of the nomadic router is that the Mobile IP protocols are not necessarily running in, or supported by, the host CPU but rather are internal to the nomadic router. The host configuration information, such as IP number, is discovered or determined as illustrated in FIG. 4 and stored in nomadic router 10 as illustrated in FIG. 2 as "Host Info." This configuration process is overviewed in FIG. 3.

Figure 2:
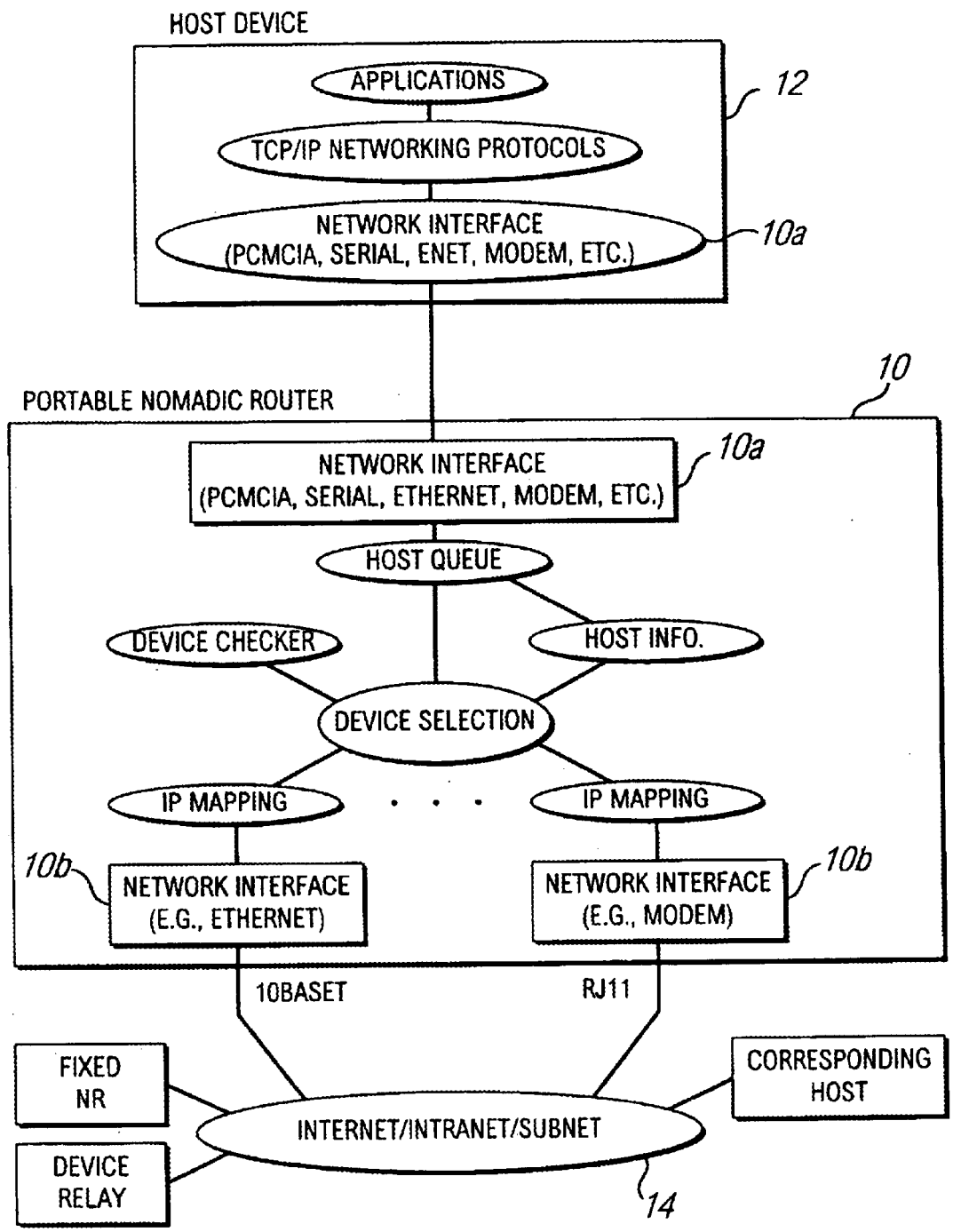
FIG. 2 is a diagram illustrating a basic nomadic router architecture, which is referred to as the hardware implementation architecture.

As illustrated in FIG. 2, nomadic router 10 can provide off-load communication processing for the host CPU by being physically separate from host device 12. The adaptation, selection, and transportation of information across the network is performed by nomadic router 10. This allows the host terminal or device 12 to utilize the network without having to directly support the network protocols. By having the nomadic router be responsible for adapting to the current network substrate, the host CPU can maintain a higher performance because the routing, adaptation, packetization, etc. algorithms, or packet processing, are performed by router 10.

The nomadic router can also queue, transmit, and receive data independent of whether the host device 12 is available or even attached. CPU 11 built into nomadic router 10 may provide all necessary computing routines to be a fully functional network co-processor independent of the host CPU. This will allow increased battery life for the user because the nomadic router does not have numerous user I/O devices as does the host device 12.

The instant network nomadic router provides the ability to provide ubiquitous and reliable support in a location independent fashion. This removes any burden on the user for device reconfiguration (e.g., IP address configuration, gateway or next hop router address, netmask, link level parameters, and security permissions) or data transmission.

The problem with existing protocol stacks is that communicating devices have to be reconfigured every time the communication environment changes. TCP/IP requires a new network node and gateway number. Appletalk will automatically choose an unused node number and discover the network number, but all open communications are lost and services have to be restarted to begin using the new information.

This occurs, for example, when a PowerBook is plugged into a network, put to sleep, and then powered up in a different network. All network services are restarted upon wakeup, and network applications get confused if they are not restarted. The nomadic router solves this problem by providing temporary as well as permanent network and node numbers similar to that provided by Mobile IP. However, the nomadic router will also work with other protocol stacks (e.g., AppleTalk).

Figure 5:
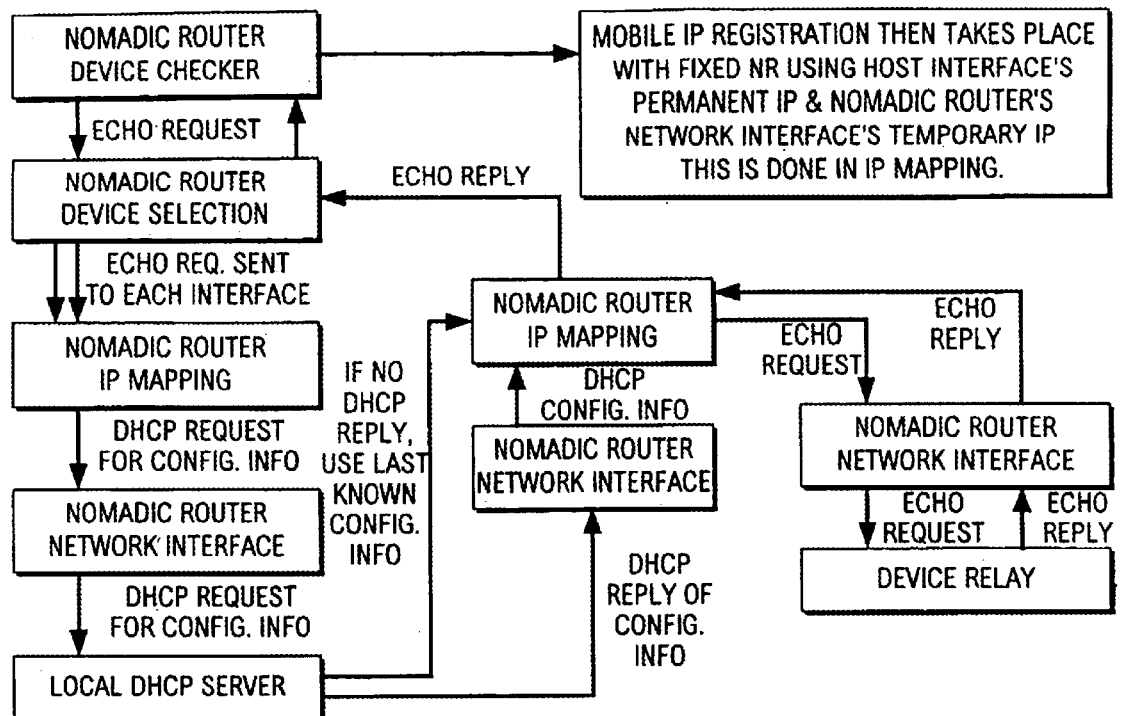
FIG. 5 is a flowchart illustrating a process initializing and checking the various communication device interfaces for initialization, activation, etc.

Mobile IP provides location independence at the network level and not at the link level. All link level parameters, which are device specific, will be automatically configured as illustrated in FIG. 5 when a new communications (network interface) device is attached to the nomadic router. The nomadic router completely eliminates the need for manual configuration by adaptively supporting device independence.

Another innovative feature of the nomadic router is the support for simultaneous use of multiple communication substrates. This is illustrated in FIG. 2 as "Device Selection." Users should be able to utilize two or more communication substrates, either to increase throughput or to provide soft-handoff capability. This functionality is not supported in today's typical protocol stacks (e.g., TCP/IP or AppleTalk). For example, via the "network" control panel, the user can select between communications substrates such as EtherTalk, LocalTalk, Wireless, ARA, etc., but cannot remotely login across EtherTalk while trying to print via LocalTalk. Routers are typically able to bridge together various communication substrates, but merging the LocalTalk and EtherTalk networks together is often not desirable for many reasons, including performance and security.

A problem with existing routers is that they require manual configuration and exist external to the node. To overcome this, the nomadic router can support automatic configuration and full router functionality internally. This allows a mobile or nomadic node to adapt to various communication and network devices dynamically, such as when the user plugs in a PCMCIA card or attaches a communications device to the serial port.

Once the nomadic router becomes aware of the available communication devices and activates them, the transport of data across the multiple communication substrates can take place. The unique algorithm and protocol in the nomadic router which chooses the most appropriate device to use, is shown in FIG. 2 and FIG. 5 as part of the "nomadic router Device Checker" through the "nomadic router Device Selection" across each interface. There are numerous factors that can affect the selection of utilizing one or more devices. Such factors typically include available bandwidth, cost to initiate and maintain connection, power requirements and availability, and user's preference.

Another feature of the nomadic router is the support for alternate or simultaneous use of various communication substrates. This is performed as part of step 5 in FIG. 6 when the source address is that of the communication substrate on which the nomadic router is going to send the packet. Host computers will now indirectly be able to utilize two or more communication substrates, either to increase throughput or to provide soft-handoff capability.

This functionality is not supported in typical protocol stacks (e.g. TCP/IP or AppleTalk). Once the nomadic router becomes aware of the available communication devices and activates them, the transport of data across the multiple communication substrates can take place. The unique algorithm and protocol in the nomadic router which chooses the most appropriate device to use is part of the "nomadic router Device Checker" through the "nomadic router Device Selection" across each interface.

Figure 6:
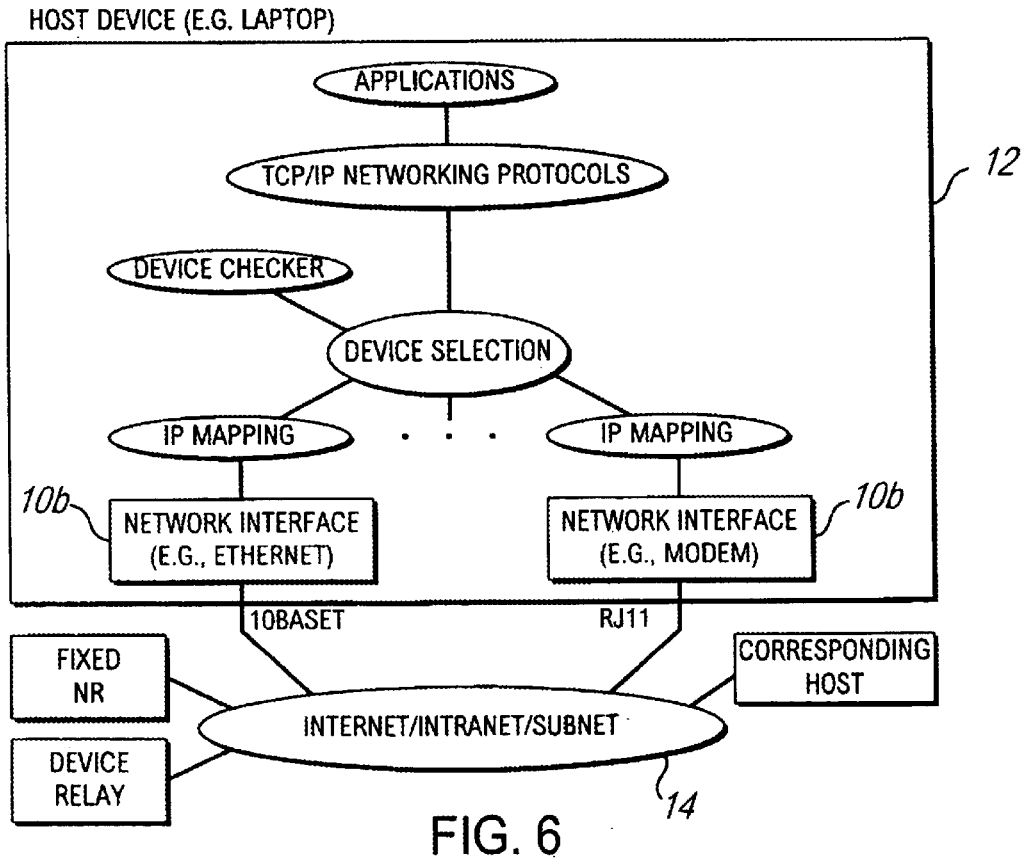
FIG. 6 is a diagram illustrating a basic nomadic router architecture when implemented as software in the host device.

The nomadic router can run completely in software without any special hardware as shown in FIG. 6, or without a CPU separate from the main host, or packaged in the form of a hardware device as shown in FIG. 2. The nomadic router can also be provided as a digital storage medium which stores the software program that implements the functionality of the router's translation processing. Examples of digital storage media include optical media (e.g. CD-ROM), magnetic media (e.g. floppy disks), non-volatile or read-only memories, or any combination thereof. The program is loaded into and run on mobile terminal 12, or alternatively into any other computer or router which is connected to a network.

One potential implementation of the nomadic router device uses Embedded PC Technology. As an example, the rugged PC/104 standard modules have a form-factor of 3.550" by 3.775" and typically 0.6" per module and weigh approximately 7 oz. per module. The PC/104 module's utilization of a self-stacking bus with minimum component count and power consumption (typically 1–2 Watts per module) eliminates the need for a backplane or card cage.

The nomadic router can run on a 16 bit bus with an 80486 processor, for example. The standard network access devices can support burst rates up to 10 Mbps with typical user data throughput around 1–2 Mbps. The user bandwidth is less depending on the available wireless communication device. For example, Proxim's 2 Mbps wireless LAN typically covers 500 yards with user data throughput around 500 Kbps. As illustrated in FIG. 1, nomadic router 10 typically includes 3 modules; a processor 10, host device or terminal interface 10a, and communication device or system interface 10b.

Another potential hardware implementation is with the CARDIO S-MOS System technology. This CPU board is basically the same size as a PCMCIA credit card adapter. It is 3.55×3.775×0.6 inches. The power requirements are +5V DC +/−10% with an operating temperature of 0 to 70° C., a storage temperature of −40 to 85° C., and relative humidity of 10% to 85% non-condensing.

The CARDIO is the most compact PC/104 compatible system available which meets the one-stack mechanical and electrical PC/104 Rev. 2.2 specifications. Power fail indicator, battery backup, and automatic switchover are also possible.

The nomadic router can also be implemented on a small portable device such as a PCMCIA card or partially on a PCMCIA card. In the case of a full implementation on a PCMCIA card, the host CPU and power supply are used to execute the Nomadic Routing and other protocols, algorithms, operating system, and application services. A hybrid implementation with some components as part of a PCMCIA card and others as part of other hardware implementation can also be used.

By performing packet translation in a self-contained apparatus, processing done on the packets in the nomadic router does not affect the host computer. All specific translation of the packets to match the network's configuration and available services is done internally to the nomadic router. The nomadic router can queue, transmit, and receive data independent of whether the host computer is available or even attached. The algorithms and microcontroller built into the nomadic router provides all necessary computing routines to be a fully functional network co-processor independent of the host computer.

By allowing the nomadic router to process packets independently of the host computer, the host computer can be powered down or asleep while processing is taking place, providing an increase in battery life for the mobile host computer.

Figure 10:
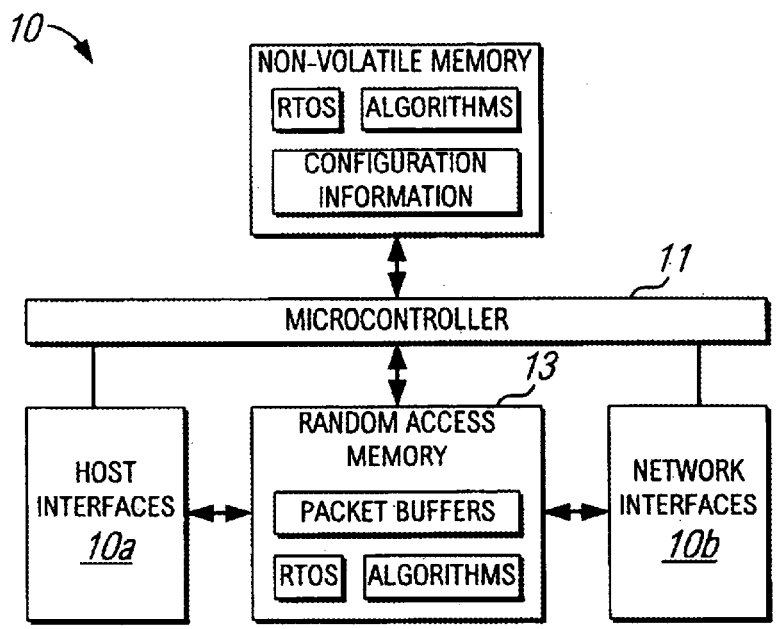
FIG. 10 is a diagram illustrating the architecture of the nomadic router implemented as a hardware device including a microcontroller and a non-volatile memory for storing algorithms implementing the translation function.

The nomadic router can be configured with various components in several different ways. In FIG. 10, the nomadic router contains a processor or microcontroller 11 to translate the packets stored in packet buffers in random access memory. The translation functions are stored in non-volatile memory 13 with the Real Time Operating System (RTOS) and configuration information relative to the types of translation that need to be performed.

Upon startup (boot) of the nomadic router, the RTOS and translation algorithms are loaded from non-volatile memory into RAM where they are executed. There may be zero, one, or more host interfaces in which host computers are connected. There are one or more network interfaces. If no host interface is available, the nomadic router receives packets via the host computer from the network interface.

Figure 11:
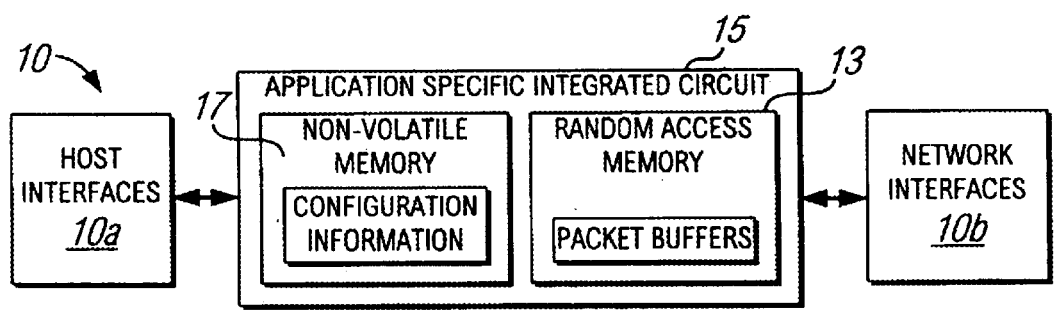
FIG. 11 is a diagram illustrating the architecture of the nomadic router apparatus implemented as an Application Specific Integrated Circuit (ASIC) chip.

In FIG. 11, nomadic router 10 is implemented as an Application Specific Integrated Circuit (ASIC) or Field Programmable Gate Array (FPGA) 15. These chips embed the algorithms for packet translation. The chip can include storage for non-volatile memory 17 which stores the configuration information such as when manually configured for the current network. The chip 15 can also include random access memory to buffer packets for translation in the nomadic router before being sent off to the host or network interface.

As described above, the nomadic router can be packaged in several different hardware configurations. The nomadic router can be embedded in the host computer, or a network device, such as a switch or router. It can also be implemented as a PCMCIA card which plugs into the host computer, or as a self-contained external box.

Figure 12A:
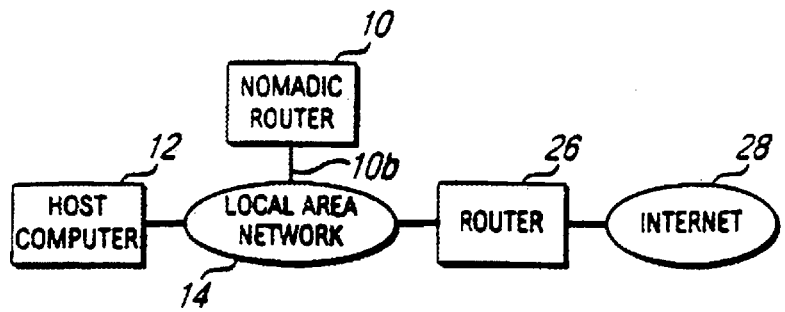
FIGS. 12A to 12E are diagrams illustrating host and network interface modes in which the nomadic router is able to operate.

Each nomadic router can have from one to many interfaces. If router 10 is put into the network infrastructure, it does not have to be carried around with the mobile user. As shown in FIG. 12a, nomadic router 10 is attached to a Local Area Network (LAN) of the network infrastructure (which constitutes the communications device 14) through system interface 10b. LAN 14 is connected through a conventional router 26 to the internet 28. In this case, host computer interface 10a of nomadic router 10 is not needed since packets from host computer 12 are received through LAN 14.

Figure 12B:
Figure 12C:
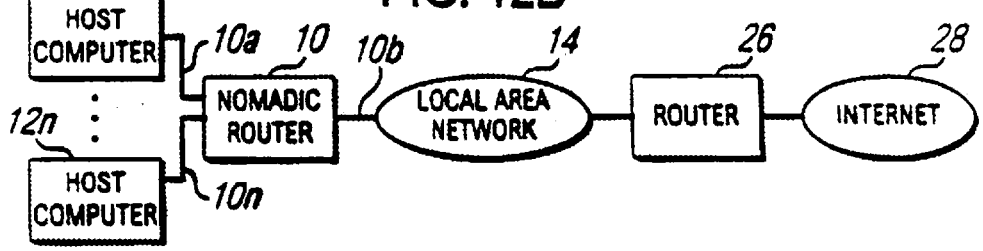
Figure 13:
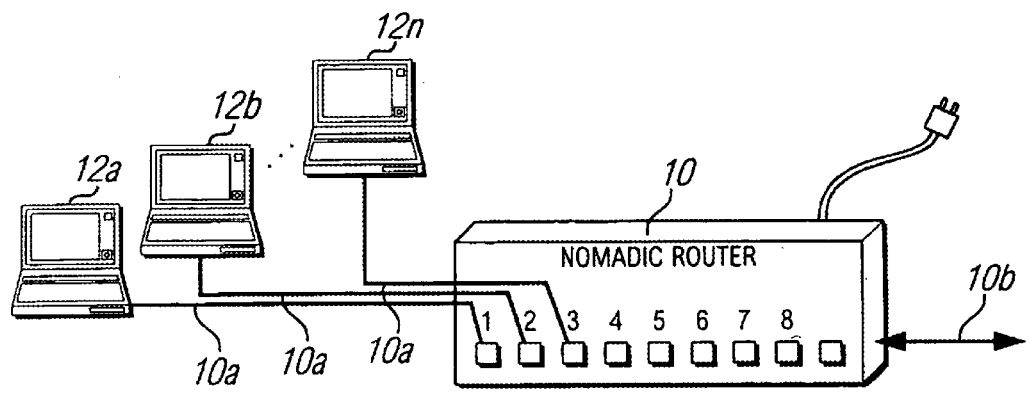
FIG. 13 is a simplified perspective view illustrating the nomadic router as implemented in a self-contained box which connects onto a local area network via a network interface port and has multiple ports to connect to host computers.

To provide a secure interface between host computer 12 and network 14 to prevent host computers from being able to watch (sniff) packets on network 14, nomadic router 10 can have one interface to host computer 12 (terminal interface 10a) and a second interface (10b) to network 14 as shown in FIG. 12B. Nomadic router 10 can provide filtering of packets received and retransmitted between the various interfaces thus providing a firewall type of security device which operates internally on the network. To support multiple host computers 12a . . . 12n with a single nomadic router 10, nomadic router 10 may have multiple host interfaces $10a_1$ . . . $10a_n$ as shown in FIGS. 12C and 20 in FIG. 13, and a network or system interface 10b.

Figure 12D:
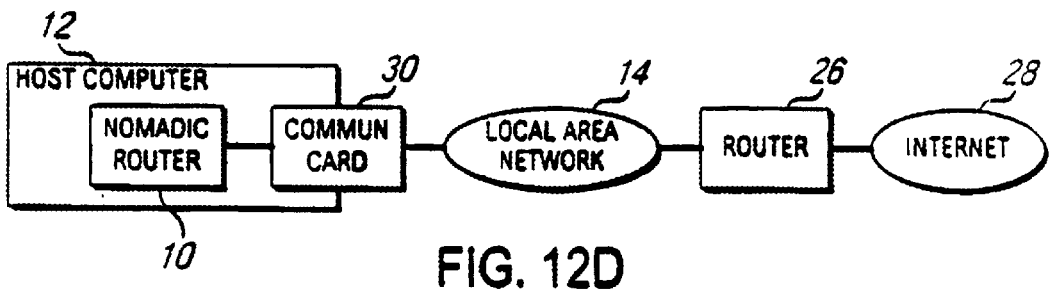
Figure 12E:
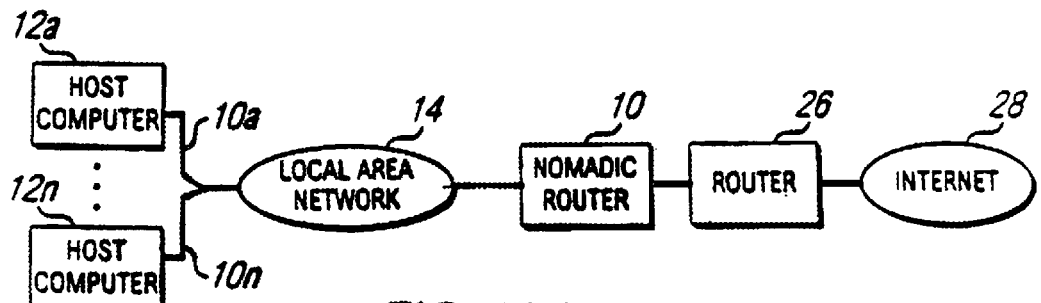

If the nomadic router is carried around by the mobile user, it can take the form of a PCMCIA card. In FIG. 12D, nomadic router 10 is implemented as a PCMCIA card. The processing and translation capability is stored inside the card and the interface to host computer 12 is through a PCMCIA BUS interface or communication card 30. The nomadic router may also be used as an interface between a local area network 14 and a router 26 as illustrated in FIG. 12E. Local area network 14 may be a mobile or portable network with router 26 being fixed at a particular location with a physical connection to the internet. Such an arrangement may be used for a customer demonstration or trade show, for example, where the local area network 14 is established among computers previously configured to communicate with each other but not with the foreign network having router 26.

Figure 14:
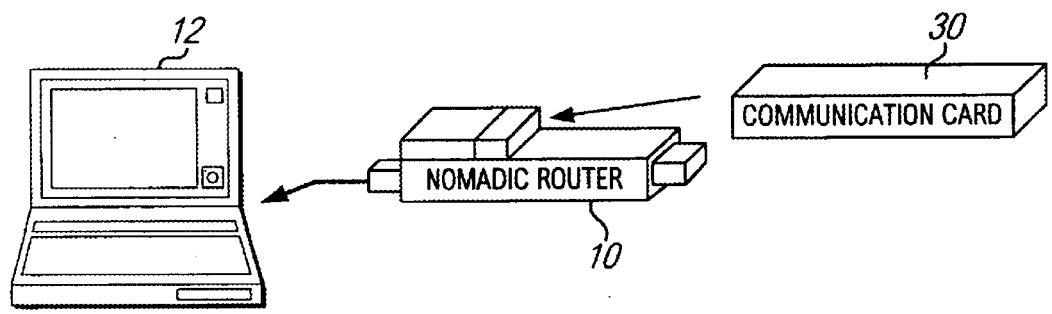
FIG. 14 is a simplified perspective view illustrating the nomadic router apparatus as implemented on a PCMCIA Type III card where the nomadic router plugs into the host computer's type II slot and the communication card device, of Type II, plugs directly into the nomadic router so both may be powered and stored in the portable host computer.
Figure 15:
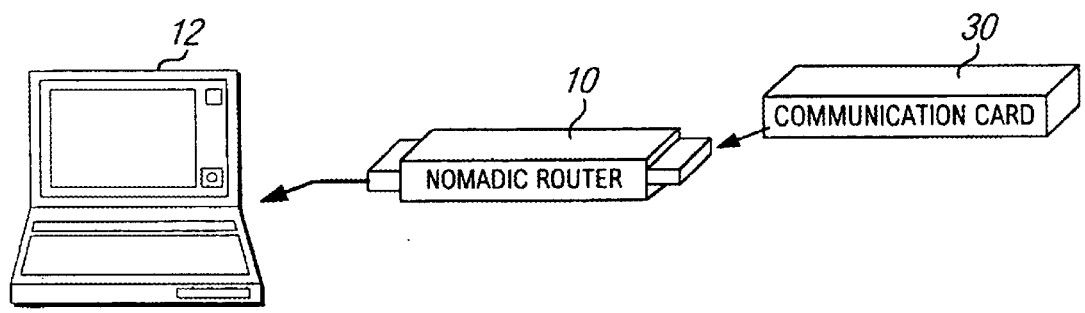
FIG. 15 is a simplified perspective view illustrating the nomadic router as implemented on a PCMCIA Type II cared where the nomadic router plugs into the host computer via a type II interface slot and where the communication card device, Type II, plugs into the nomadic router type II card.

As shown in FIG. 14, the PCMCIA card can fit in a type III slot where there is a connector on nomadic router 10 which accepts communication card 30 (a type II PCMCIA card). In this mode, the nomadic router does not require internal communication device specific components. Nomadic router 10 can also take the form of a type II PCMCIA card. In this form, the communication device or card 30 plugs into the opposite end of nomadic router card 10 as illustrated in FIG. 15.

The nomadic router initialization and self configuration process provides the means by which the nomadic router is able to learn about the host computer and network so it knows what translation is necessary. Depending on the particular application, the nomadic router may have to learn the configuration of the host computer, the remote/foreign network, or both. For example, when utilized as a fixed nomadic router in a hotel or multiple dwelling unit, the nomadic router will have already learned (or been manually configured for) the remote/foreign network. The nomadic router need only determine the settings of mobile hosts which are subsequently connected to the network. Similarly, when the nomadic router is implemented as a PCMCIA card which travels with the mobile host, the nomadic router need only learn the settings of the foreign/remote network (since the host settings were previously learned or manually configured). In some applications, the nomadic router learns both the network and host configurations as previously described.

Nomadic router 10 is able to learn the host computer 12 configuration by looking at the content of the packets sent from host computer 12. Rather than host computer 12 sending packets directly to router 26 or other network device (which is what it is initially configured to do), nomadic router 10 is able to redirect all outbound packets from the host computer 12 to itself. This redirection can be accomplished in several ways as described below.

Figure 8:
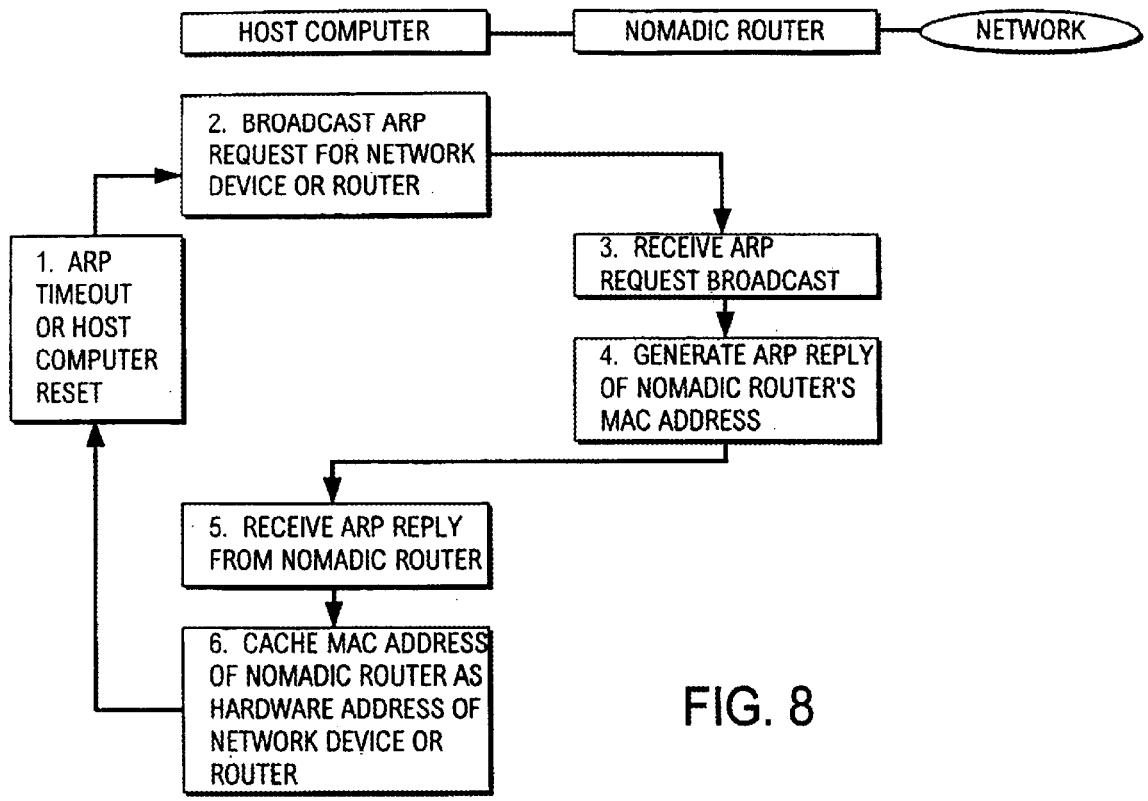
FIG. 8 is a flowchart illustrating a proxy ARP packet interception and host reconfiguration process.

Whenever a host computer 12 has an IP packet to send to router 26 or other network device, host computer 12 uses the Address Resolution Protocol (ARP) to obtain the link layer Media Access Control address (MAC address). As illustrated in FIG. 8, when host computer 12 broadcasts an ARP request for the MAC address of a destination node, nomadic router 10 intercepts this ARP request broadcast and responds with its own MAC address (rather than that of the destination node).

When host computer 12 receives the ARP reply from nomadic router 10 (which contains the MAC address of nomadic router 10), host computer 12 will cache this MAC address and send all packets destined for the configured router or network device to the MAC address of nomadic router 10. Host computer 12 will think that the MAC address is that of its originally configured IP network device. However, nomadic router 10 is only pretending (proxying) to be the device (its home gateway) that host computer 12 expects to find. Since the MAC address is cached in host computer 12 for a short period of time, host computer 12 will not send out a new ARP request to obtain the MAC address again unless a timeout period occurs or the cache is cleared, such as when computer 12 is restarted.

When a conventional network device receives or hears a packet with a MAC address which does not match its own, it will ignore or drop the packet. Since it is possible to rapidly switch from one network environment to another using a portable computer, nomadic router 10 must be able to intercept packets even when the MAC address is not that of the nomadic router's home gateway or device. This is accomplished by placing the nomadic router's network connection is promiscuous mode. In this mode, the network connection on the nomadic router accepts all packets being transmitted on the communication link, not just ones being broadcast or addressed specifically to it.

Nomadic router 10 may also provide other network services to host computer 12. For example, host computer 12 may be able to utilize the DHCP service to obtain configuration information rather than being manually configured. However, a host computer utilizing the DHCP service requires that a DHCP server be installed on the network segment to which it is currently attached. If the host computer 12 is configured to use this service but a DHCP server is not available on the remote/foreign network, nomadic router 10 will intercept the DHCP requests and respond with configuration information for host computer 12 to use.

The nomadic router is able to learn about the network environment it is currently attached using several different methods as described below.

When the nomadic router is connected to a different network, it will broadcast a DHCP request to obtain configuration information for that network. If no DHCP service is available on the network, the nomadic router will use another method to learn about the network configuration. For example, routers on the network will periodically broadcast router information packets which are used to build routing tables and allow routers to adapt to changes in the network. Nomadic router 10 will listen on the network for these router information packets. When a router information packet is received, the nomadic router will extract the configuration information from each packet and store the information for use in translating packets from the mobile host.

By placing the nomadic router's network connection in promiscuous mode, the nomadic router receives all packets (not just ones addressed to the nomadic router). The nomadic router examines all packets received on the network interface to discover the network configuration. The nomadic router is also able to determine the IP addresses used on the current network and which machines are routers (by the final destination address not being the next hop address). Using this method, nomadic router 10 is passively able to learn how the network is configured and will elect to use an unused IP address. If that IP address does become used by another network device, the nomadic router will switch over to another unused IP address.

The network configuration information can also be manually configured in the nomadic router 10 as described above. This information can be set using an embedded web server, Simple Network Management Protocol (SNMP) tools, an application running on one of the computers in the network, or other suitable means. When manual configuration is used to set the network configuration, nomadic router 10 will still automatically learn the host information and provide all the translation capabilities so the host computers do not have to be aware of the correct network information of the LAN to which they are currently connected.

After learning the network and/or host computer configuration(s), the nomadic router has the necessary information to translate packets transmitted/received by the host computer. The nomadic router's packet translation function provides a mapping between location and service dependent configurations used by host computer 12 and that used by network 14 to which it is currently attached. For outbound traffic from host computer 12 to network 14, the translation function changes the content of the packet such as the source address, checksum, and application specific parameters, causing all packets sent out to network 14 to be directed back to nomadic router 10 rather than to host computer 12.

Inbound traffic from network 14 arriving at nomadic router 10 (which is really for host computer 12), is passed through the translation function so host computer 12 thinks that the replies were sent directly to it. Host computer 12 will be completely unaware of all the translation being performed by nomadic router 10.

Figure 9B:
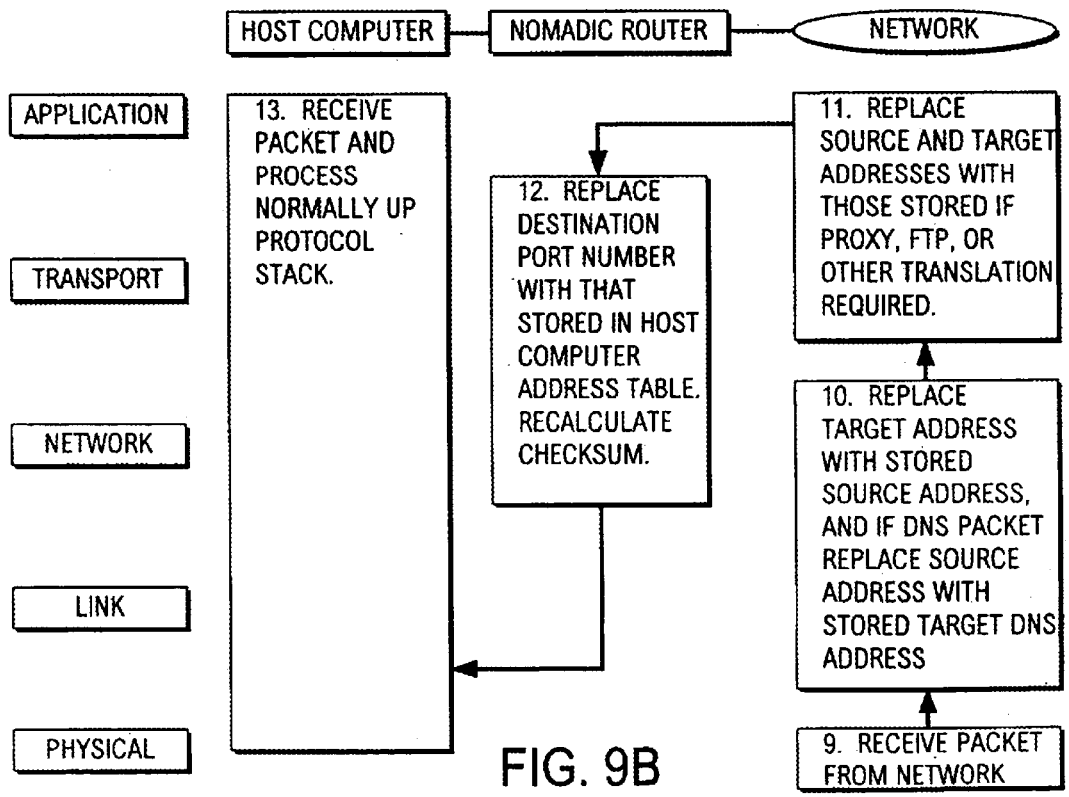
FIGS. 9A and 9B provide a flowchart illustrating a translation process which takes place in the host computer and nomadic router at various levels in the protocol stack.
Figure 9A:
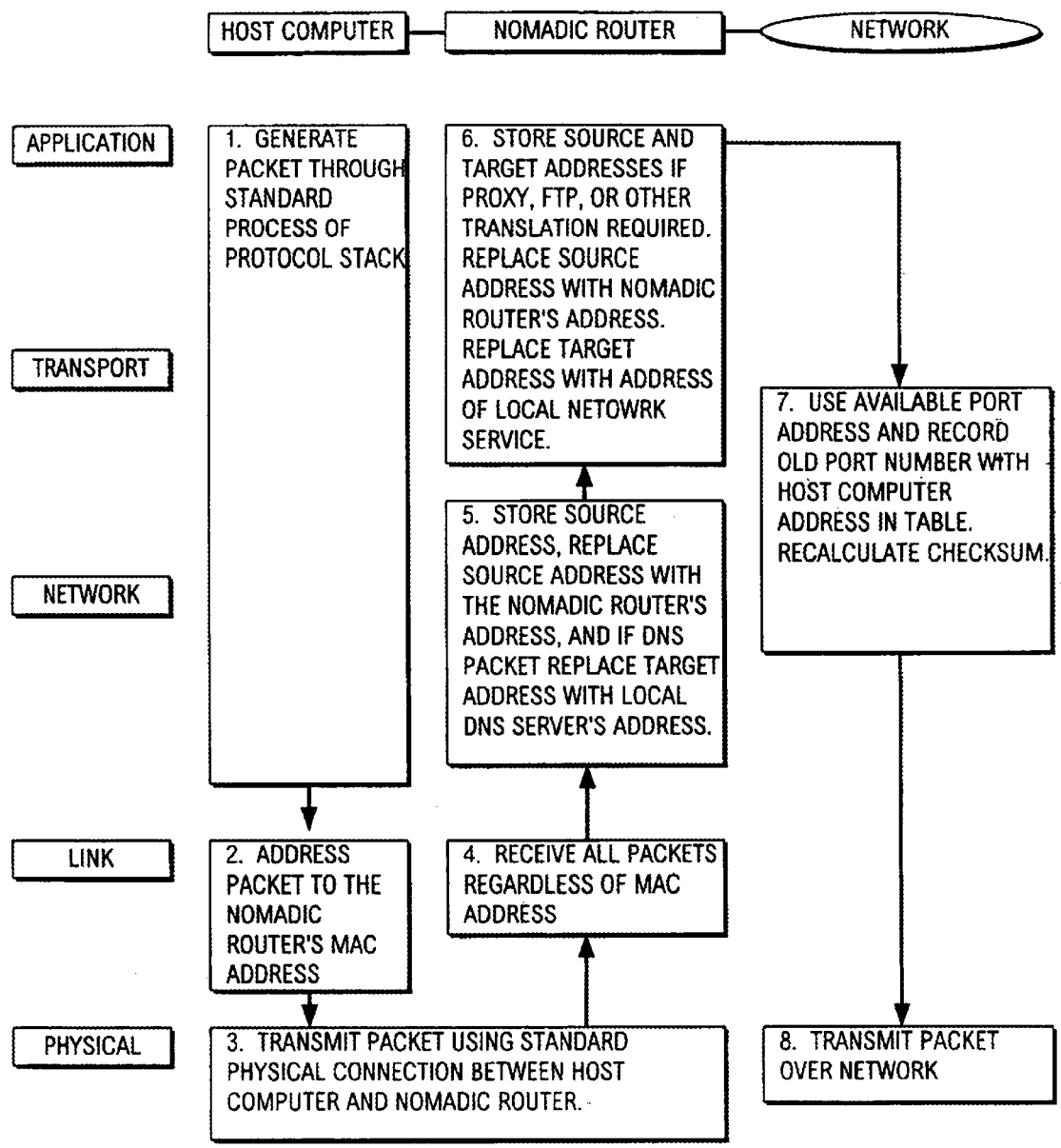

The translation functions works as illustrated in FIGS. 9a and 9b. In these figures, the operations performed in the OSI/ISO model application, transport, network, link, and physical layers are illustrated in rows opposite the layer designations. The operations performed by host computer 12, nomadic router 10 and network 14 are illustrated in columns below the device designations. Host computer 12 will generate network packets using the current configuration stored in host computer 12 using the standard protocol stack as shown in step 1. This configuration information is either manually configured in host computer 12 or obtained using DHCP (from the network or the nomadic router).

As shown in step 2, when host computer 12 attaches the link level destination address (automatically obtained using the Proxy ARP packet interception routine described earlier), host computer 12 will send the packet to the network address of its standard router or home gateway device using the link level address of the nomadic router 10.

In step 3, the packet is transmitted across the standard physical connection between host computer 12 and nomadic router 10. As shown in step 4, nomadic router 10 will receive the packet at the link level either because the Proxy ARP function reconfigured the host computer's MAC address, or because nomadic router 10 has the network link level in promiscuous mode which causes it to receive the packet even if addressed to a different MAC address.

Once the packet is passed to the network layer, shown in step 5, the nomadic router translation function will modify the content of the packet to change the source address to match that of the nomadic router's address instead of the host computer's address. It will also translate other location dependent information such as the name of the local Domain Name Service (DNS) server. When translating the DNS packet, it will change the source address to that of the nomadic router's address and the destination address to that of a local DNS server.

Once the network layer translation is complete, the packet can be translated at the application and transport layers. The application layer is translated next, as shown in step 6, because the transport layer requires a pseudo-network layer header which includes the source and destination addresses and the content from the application layer. At the application layer translation, any addresses which describe the source address of the host computer, such as with FTP, are translated to be that of the nomadic router's address. Any application layer destination addresses, such as a local proxy server, are translated to match that of the server running on the current network.

Once this application layer translation is complete, the transport layer, as shown in step 7, can complete the checksum and any port number manipulation. The port number is manipulated if more than one host computer 12 is attached to nomadic router 10. Each request sent by any one of the host computers 12 include a specific port that is translated to match an available inbound port on the nomadic router 10.

The port number assigned for use with each host computer 12 is stored in a table in nomadic router 10 and is utilized with the reply packet to route the reply to the corresponding host computer as describer later. Finally, the outgoing packet is transmitted over network 14 in step 8.

When a reply packet is transmitted over network 14, as shown in step 9, nomadic router 10 will receive the packet. In step 10, nomadic router 10 will perform the reverse network layer translation to set the destination address to that of host computer 12 rather than the nomadic router's address, and any source address to the source address replaced by nomadic router 10 in step 5.

Once network translation is complete, the packet is translated at the application layer, as shown in step 11, to change the destination address to that of host computer 12 and the source address to the original destination address stored from step 6. In step 12, any port manipulation performed in step 7 is changed to the original setting and a new checksum is computed. Finally, as shown in step 13, the packet is sent to host computer 12 which then processes the packet normally.

There are numerous options and applications of the nomadic router. These applications include, but are not limited to, Nomadic E-mail, Remote Network File Synchronization, Nomadic Database Synchronization, Instant Network Nomadic Routing, Nomadic Intranets, and Trade Show Data Exchange. Each of these are described in more detail below.

The Nomadic E-mail application provides a synchronized yet distributed means for updates, reconciliation, and replicas to propagate through the internet. Nomadic routers are located on various networks of the internet and are equipped with nomadic E-mail support to provide synchronization, etc. Each nomadic router enabled for nomadic E-mail can utilize protocols such as IMAP to provide support for mobile users without the host device having to support it (similar to the POP3 protocol standard in internet E-mail clients).

The Remote Network File Synchronization option of the nomadic router provides copies of user files that are stored/cached at various locations (e.g., hotel, office, home) on other nomadic routers equipped for remote network file synchronization. Copies of updated files are automatically synchronized and distributed among all peer locations. Local updates can be made while the host is disconnected from the nomadic router and from the network.

The Nomadic Database Synchronizer houses the user's (synchronized) master databases (e.g., contacts, addresses, phone numbers). The nomadic router of the database synchronizer does not need to be used on the network because it will interface directly with various host devices such as laptops, desktops, personal digital assistants, handheld personal computers, pagers, etc. via various standard porets.

The objective of the Instant Network nomadic router is to enable rapid deployment of a communication network in any environment with little or no fixed infrastructure. The host and communication devices do not have to directly support the rapid deployment functionality.

The instant network nomadic router distributedly and intelligently establishes a wireless (or wired) communication link between the host device and the desired communication system while performing configuration, security, multihop routing, and network level data transmission over various communication devices. The nomadic router performs all the necessary network creation and processing automatically to remove configuration and system support from the host system or user. The instant network nomadic router utilizes proprietary and existing/emerging wireless communication systems, and multihop routing protocols.

Many communication infrastructures are varied and fragmented, which is likely to be exacerbated as more technologies are introduced. For example, high performance LANs, wireless services, cellular telephony, satellite, and ubiquitous paging networks, all provide varying degrees of coverage, cost, and bandwidth/delay characteristics.

Conditions may range from no connectivity at all because of lack of service, to partial and/or intermittent connectivity as devices are plugged and unplugged from a system. Likewise, damage communication infrastructures (deliberately or by accident), lossy communication as a system moves through various service areas or difficult domains, and times when multiple network devices (communication substrates) can be used at the same time complicate connectivity. The instant network nomadic router will dynamically adapt the communication internetwork (dynamically creating one if necessary) to provide survivable communication in a mobile chaotic environment without the need for centralized control or fixed infrastructures.

The rapidly deployable nomadic router is a device associated with each user host device (e.g., PDA or laptop computer). It transparently provides the following capabilities for host computer systems using various wireless communication devices for physical and link layer access: dynamic wireless network creation; initialization into existing wireless networks; automatic configuration; network and subnetwork level data transmission; and multihop routing functionality.

The nomadic router can detect another device by polling the interface, providing an interrupt signal, or through specialized signaling. This in turn activates the nomadic router to provide translation for the device (if necessary) and establish a communication link to an appropriate corresponding interface and wireless subnetwork. The nomadic router operates at a level between the host device generating data and the physical communication transmission device as illustrated in FIG. 1.

The Nomadic Intranet application provides all network and server type services for users to dynamically create an adhoc network. This is similar to the instant network nomadic router except the nomadic intranet is a single device with multiple ports into which laptop/devices can be plugged. The instant network nomadic router is distributed to each host device. The nomadic intranet not only provides adhoc networking but can also provide services such as temporary file storage, protocol conversion, act as a print server, and provide other services described as part of the Basic nomadic router.

The Trade Show nomadic router applications not only provide the basic nomadic router functionality for an exhibitor's computer that is brought to the show, but also provides lead capture and/or information distribution. Lead capture can be provided by interfacing with a badge reader to read attendees' information. This information is then captured by the nomadic router and made available in the exhibitor's lead database.

The Nomadic Intranet application provides all network and server type services for users to dynamically create an adhoc network. This is similar to the instant network nomadic router except the nomadic intranet is a single device with multiple ports into which laptop/devices can be plugged. The instant network nomadic router is distributed to each host device. The nomadic intranet not only provides adhoc networking but can also provide services such as temporary file storage, protocol conversion, act as a print server, and provide other services described as part of the Basic nomadic router.

As briefly described above, the fixed nomadic router applications provide the same basic functionality and architecture as the portable nomadic router with the nomadic router stored in one location. The fixed nomadic router acts as a surrogate or "Home Agent" for the user when he/she is away on travel. When the user wishes to register or utilize their host device elsewhere in the network, the portable nomadic router will register with the fixed nomadic router where it is temporarily attached to the network so information can be forwarded to the user's new location. The fixed nomadic router can also be used to house the master copy of the user's E-mail for the nomadic E-mail service, or files for the nomadic file synchronizer.

The nomadic router provides the mapping between the location-based IP address used in the internet today and the permanent user-based address housed in the host CPU. This mapping is done without support or knowledge of such mapping by the host CPU or user. The Internet RFC 2002 Mobile IP protocol specifies the mapping between permanent and temporary IP addresses. The unique aspect of the nomadic router is that the Mobile IP protocols are not necessarily running in, or supported by, the host CPU, but rather are internal to the nomadic router.

By implementing this protocol as part of the translation function in the nomadic router, the nomadic router can encapsulate packets from the host computer and transmit them back to the fixed nomadic router which are sent out (un-encapsulated) on the native (home) network. Replies from the home network are received by the fixed nomadic router and are encapsulated and sent back to the nomadic router. When packets are transmitted between the nomadic router and fixed nomadic router, the packets are encrypted and sent using the Internet Tunneling Protocol.

Since the (mobile) nomadic router provides location independence and the fixed nomadic router forwards all packets from a corresponding host to the host computer via the nomadic router, any changes in the location, failure of a network link, or attachment point of the mobile host computer does not cause any open session to be lost. This session loss prevention is possible since the fixed nomadic router pretends to be the mobile host computer, and the nomadic router pretends to be the home network. The fixed nomadic router and nomadic router translation functions hide the link and network loss from the transport and application session.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for providing connectivity between a foreign device on a second local area network and a user device configured for a first local area network, the user device having a permanent address, the method comprising:
   intercepting packets transmitted by the user device intended for the foreign device on the second local area network to automatically determine network settings of the user device, the packets transmitted by the user device having the permanent address of the user device as a source address;
   modifying packets transmitted by the user device to make these packets compatible with the second local area network based on the network settings of the user device and on network settings of the second local area network such that the second local area network appears as the first local area network to the user device;
   wherein modifying packets transmitted by the user device includes substituting the permanent address of these packets with a router address as the source address, wherein the router address is an address recognized by the foreign device;
   intercepting packets transmitted by the foreign device intended for the user device, the packets transmitted by the foreign device having the router address as a destination address;
   modifying packets transmitted by the foreign device to make these packets compatible with the first local area network based on the network settings of the user device and on the network settings of the second local area network such that the first local area network appears as the second local area network to the foreign device;
   wherein modifying packets transmitted by the foreign device includes substituting the router address of these packets with the permanent address as the destination address.

2. The method of claim 1 wherein the step of intercepting packets transmitted by the user device comprises receiving and processing packets transmitted by the user device which would otherwise be dropped by devices on the second local area network due to incompatible network settings.

3. The method of claim 1 further comprising:
   automatically determining the network settings of the second local area network based on packets transmitted over the second local area network.

4. The method of claim 1 further comprising:
   automatically determining the network settings of the second local area network by transmitting a Dynamic Host Control Protocol (DHCP) packet over the second local area network.

5. The method of claim 1 wherein the step of intercepting packets transmitted by the user device comprises:
   intercepting an Address Resolution Protocol (ARP) message transmitted by the user device having a network address of a device on the first local area network; and
   replying to the ARP message with a Media Access Control (MAC) address of a device on the second local area network.

6. The method of claim 1 wherein the step of intercepting packets transmitted by the user device comprises operating in a promiscuous mode to receive and process all packets transmitted by the user device.

7. The method of claim 1 wherein the router address is automatically determined based on the network settings of the second local area network.

8. The method of claim 7 wherein the step of substituting the permanent address of a packet transmitted by the user device comprises replacing a source address within a packet header.

9. The method of claim 7 wherein the step of substituting the permanent address of a packet transmitted by the user device comprises replacing a source address within contents of the packet.

10. The method of claim 1 wherein the step of intercepting packets transmitted by the user device comprises:
    intercepting a Dynamic Host Control Protocol (DHCP) packet transmitted by the user device;
    determining whether a DHCP server is available on the second local area network; and
    replying to the DHCP packet to provide configuration settings based on network settings of the second local area network.

11. A method for providing access to a network utilizing private IP addresses for a user device having an incompatible private IP address, the method comprising:
    intercepting data transmitted by the user device containing the incompatible private IP address;
    modifying the data using a private IP address compatible with the network private IP addresses; and
    transmitting the modified data on the network.

12. The method of claim 11 further comprising connecting a translator to the network to perform the steps of intercepting the data transmitted by the user device, modifying the data, and transmitting the data.

13. The method of claim 12 wherein the step of connecting comprises connecting the translator between the user device and the network.

14. The method of claim 12 wherein the user device and translator are directly connected to the network.

15. The method of claim 11 wherein the step of intercepting packets comprises receiving and processing packets which would otherwise be dropped by devices on the second local area network due to incompatible network settings.

16. The method of claim 11 wherein the step of intercepting packets comprises operating in a promiscuous mode to receive and process all packets transmitted by the user device.

17. The method of claim 11 wherein the step of intercepting packets comprises:
- intercepting an Address Resolution Protocol (ARP) message transmitted by the user device; and
- replying to the ARP message with a hardware address of a device on the network so future messages transmitted by the user device are directed to the device on the network.

18. A method for providing access to a network utilizing DHCP for a user device configured with a static IP address, the method comprising:
- intercepting packets transmitted by the user device to determine the static IP address;
- transmitting a DHCP request on the network to determine at least one available network IP address;
- modifying the packets transmitted by the user device based on an available IP address; and
- transmitting the modified packets on the network to provide network access to the user device.

19. A method for providing connectivity to a first network for a user device, the user device having a permanent address, the method comprising:
- automatically determining network settings of the first network based on addresses contained in messages transmitted over the first network;
- intercepting user device messages transmitted over the first network without regard to message destination addresses, the user device messages having the permanent address of the user device as a source address; and
- modifying incorrectly configured messages transmitted by the user device based on the network settings of the foreign network, wherein modifying incorrectly configured messages transmitted by the user device includes substituting the permanent address of these messages with a router address as the source address, wherein the router address is an address recognized by the foreign network.

20. The method of claim 19 wherein the user device is configured to communicate over a home network having network settings incompatible with the foreign network, the method further comprising:
- automatically determining network settings of the user device by intercepting an Address Resolution Protocol (ARP) message transmitted by the user device having a destination address of a device on the home network and replying to the ARP message by associating a Media Access Control (MAC) address of a device on the first network with the destination address of the device on the home network.

* * * * *

UNITED STATES PATENT AND TRADEMARK OFFICE
CERTIFICATE OF CORRECTION

PATENT NO. : 7,088,727 B1  Page 1 of 1
APPLICATION NO. : 09/684937
DATED : August 8, 2006
INVENTOR(S) : Joel E. Short et al.

It is certified that error appears in the above-identified patent and that said Letters Patent is hereby corrected as shown below:

Column 20, Line 7, Claim 19:
Delete "foreign" and insert therefor -- first --.

Column 20, Line 12, Claim 19:
Delete "foreign" and insert therefor -- first --.

Column 20, Line 15, Claim 20:
Delete "foreign" and insert therefor -- first --.

Signed and Sealed this

Twelfth Day of December, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,088,727 B1 | Page 1 of 1 |
| APPLICATION NO. | : 09/684937 | |
| DATED | : August 8, 2006 | |
| INVENTOR(S) | : Joel E. Short et al. | |

It is certified that error appears in the above-identified patent and that said Letters Patent is hereby corrected as shown below:

On the Title Page:

Item (63) Delete "continuation" and insert therefor --continuation-in-part--.

Column 1, Line 8:
Delete "continuation" and insert therefor --continuation-in-part--.

Signed and Sealed this

Twenty-second Day of May, 2007

JON W. DUDAS
*Director of the United States Patent and Trademark Office*